United States Patent [19]

Cooper et al.

[11] Patent Number: 5,696,602

[45] Date of Patent: Dec. 9, 1997

[54] METHOD FOR HALFTONING USING STOCHASTIC DITHERING WITH MINIMUM DENSITY VARIANCE

[75] Inventors: Brian Edward Cooper, Lexington; Thomas Anthony Knight, Nicholasville; Shaun Timothy Love, Lexington, all of Ky.

[73] Assignee: Lexmark International, Inc., Lexington, Ky.

[21] Appl. No.: 522,010

[22] Filed: Aug. 31, 1995

[51] Int. Cl.[6] .................... H04N 1/40; G06K 9/40
[52] U.S. Cl. .............. 358/457; 358/455; 358/456; 382/254
[58] Field of Search ................. 358/455, 456, 358/457, 534, 535, 536; 382/254

[56] References Cited

U.S. PATENT DOCUMENTS

| | | | |
|---|---|---|---|
| 5,111,310 | 5/1992 | Parker | 358/456 |
| 5,214,517 | 5/1993 | Sullivan et al. | 358/456 |
| 5,317,418 | 5/1994 | Lin | |

OTHER PUBLICATIONS

M. Analoui and J. P. Allebach, "Model Based Halftoning Using Direct Binary Search", Proc. of the SPIE, vol. 1666, pp. 96–108, Feb. 1992.

T. N. Pappas and D. L. Neuhoff, "Model–Based Halftoning", Proc. of the SPIE, vol. 1453, pp. 244–255, Feb. 1991.

T. N. Pappas and D. L. Neuhoff, "Least–Squares Model–Based Halftoning", Proc. of the SPIE, vol. 1666, pp. 165–176, Feb. 1992.

J. Sullivan, L. Ray and R. Miller, "Design of Minimum Visual Modulation Halftone Patterns", IEEE Transactions on Systems, Man, and Cybernetics, vol. 21, No. 1, pp. 33–38, Jan./Feb. 1991.

R. A. Ulichney, "The void–and–cluster method for dither array generation", Proc. of the SPIE, vol. 1913, pp. 332–343, Sep. 1993.

M. Yao and K. J. Parker, "Modified Approach to the Construction of a Blue Noise Mask", Journal of Electronic Imaging, vol. 3, No. 1, pp. 92–97, Jan. 1994.

*Primary Examiner*—Kim Vu
*Assistant Examiner*—Tia M. Harris
*Attorney, Agent, or Firm*—Frederick H. Gribbell

[57] ABSTRACT

A dispersed-dot stochastic dither array is provided for rendering halftone images having excellent visual quality and are created by a minimum density variance method. The minimum density variance method considers the statistical distribution of the pixels in the image, and is unrelated to previous techniques based on either spatial frequencies or spatial distances, such as the blue noise mask and the void and cluster algorithm. By minimizing the variance in the number of dots within each local region of the image, a smooth and dispersed distribution of dots may be obtained. The method of the present invention also offers the flexibility to accommodate particular design considerations, through the selection of the size and shape of the image regions, the weighting of the cost function, and the option of guiding the selection of dots with "target" dot profile images.

20 Claims, 12 Drawing Sheets

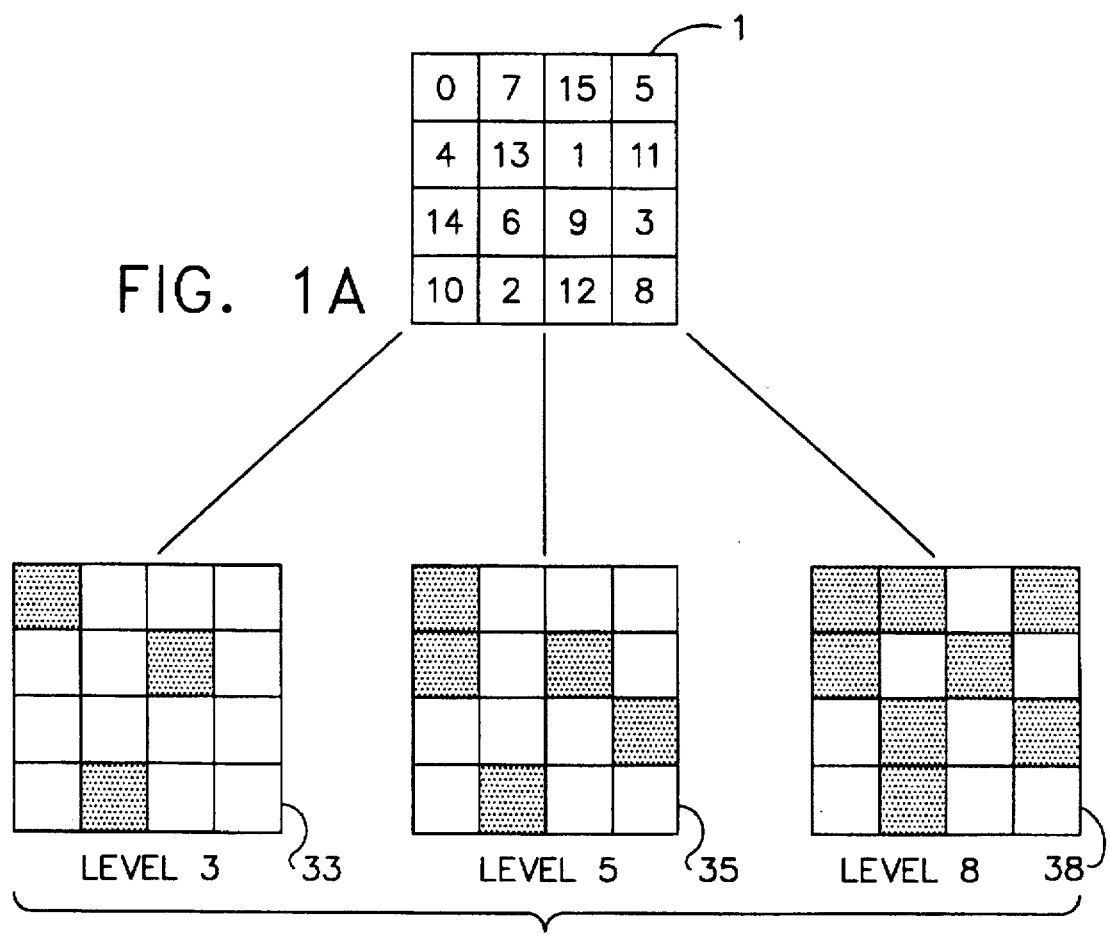
FIG. 1A
FIG. 1B
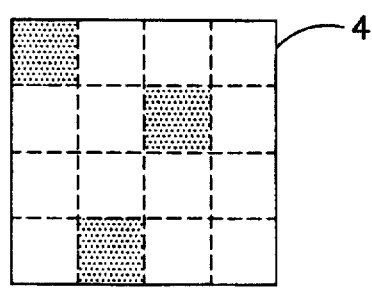
FIG. 2A

DENSITY ARRAY

DOT PROFILE

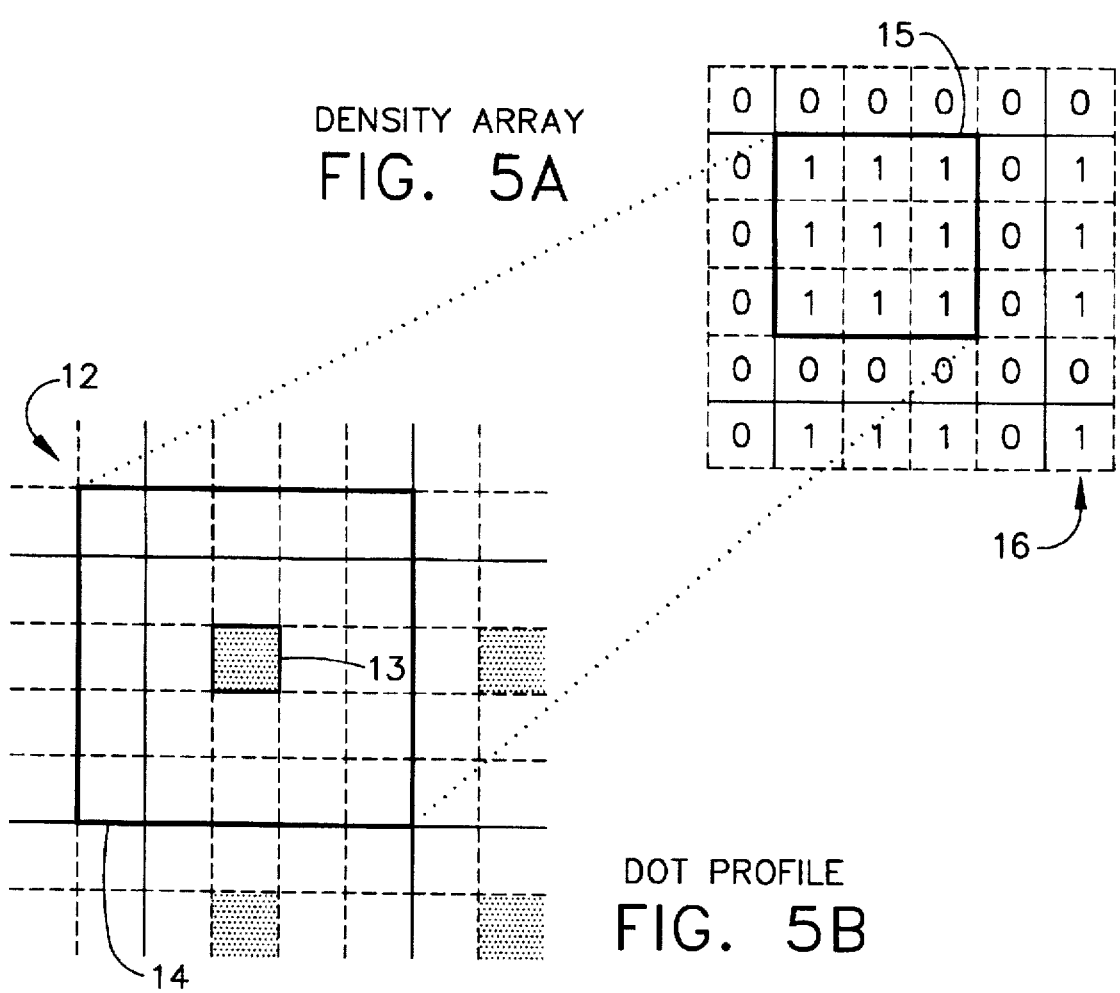
DENSITY ARRAY
FIG. 5A
DOT PROFILE
FIG. 5B
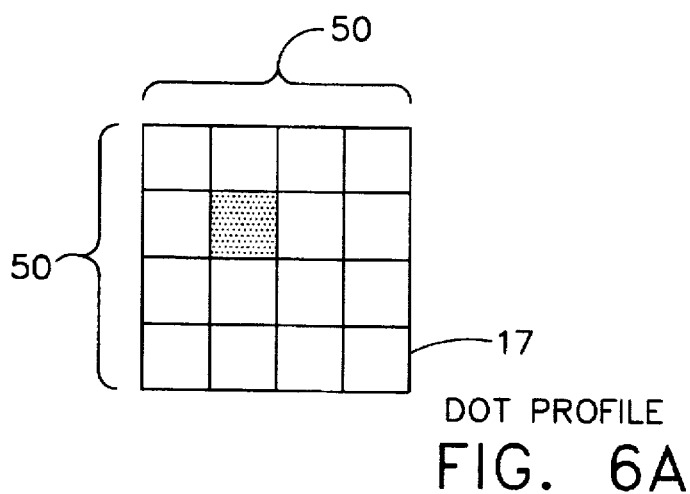
DOT PROFILE
FIG. 6A

DENSITY ARRAY

DOT PROFILE

DENSITY ARRAY

DENSITY SUM ARRAY

WITH WEIGHTS $W_1 = W_2 = W_3 = W_4 = 0.25$

DELTA DENSITY SUM ARRAY

METHOD FOR HALFTONING USING STOCHASTIC DITHERING WITH MINIMUM DENSITY VARIANCE

TECHNICAL FIELD

The present invention relates generally to a method for halftoning digital images and is particularly directed to using a dispersed-dot stochastic dither array with a statistical approach called the minimum density variance method. The invention is specifically disclosed in which halftone images are rendered using a dither matrix representing correlated dot patterns, in which the dots of each dot pattern are arranged to minimize a function of the variances in the number of dots per region across an appropriate range of region sizes.

BACKGROUND OF THE INVENTION

Halftoning describes the process of displaying an image on a device which is capable of representing only a finite, discrete number of tone levels. The position and arrangement of the discrete picture elements should create the illusion of a continuous-tone image. Using the traditional halftoning techniques of clustered-dot ordered dither and dispersed-dot ordered dither, undesirable visual patterns often appear, caused by the fact that the dots are placed along a distinct, rectangular (or sometimes hexagonal) grid. For colored images, there is the additional disadvantage of moire patterns, resulting from the interaction of the spatial frequencies of the halftone patterns of the individual primary colors.

To overcome some of these difficulties, halftoning methods which incorporate randomness have been developed to eliminate the distinctly periodic patterns of ordered dither. In addition, colored images rendered with random dither are free of moire patterns. The earliest attempts to incorporate randomness used white noise, in which all spatial frequencies were represented equally. Although images rendered with white noise dither are free of periodic artifacts, the images nevertheless looked too grainy, which is caused by the presence of low spatial frequencies in the halftone pattern. If the low frequency or "pink noise" content of the signal is eliminated, the remaining "blue noise" retains only higher spatial frequencies. In a book titled *Digital Halftoning*, by R. A. Ulichney, it was disclosed that images rendered with blue noise dither possess sharp detail and are free of the visual artifacts of ordered dither.

Blue noise, or more generally, dispersed-dot stochastic halftoning offers superior visual quality. The earliest blue noise method, error diffusion, considers the quantization error in neighboring pixels when deciding how to quantize the current pixel. Other techniques incorporate models of the printing device's physical behavior, or human visual perception, or a combination of both considerations. Examples of these other techniques include the minimum visual modulation approach described in an article titled *Design of Minimum Visual Modulation Halftone Patterns*, by J. Sullivan, L. Ray, and R. Miller; modified error diffusion, disclosed in an article titled *Model-Based Halftoning*, by T. N. Pappas and D. L. Neuhoff; least-squares model-based halftoning, disclosed in an article titled *Least-Square Model-Based Halftoning*, by T. N. Pappas and D. L. Neuhoff; and direct binary search, disclosed in an article titled *Model-based Halftoning Using Direct Binary Search*, by M. Analoui and J. P. Allebach.

The minimum visual modulation approach described by Sullivan et al. builds a set of 256 binary images (one for each gray level) by optimizing each binary image according to a human visual modulation transfer function. The minimization technique of simulated annealing leads toward an optimal solution, however, the computational costs of each comparison is expensive, requiring a Fourier transform of each potential dot profile. The advantage is that, once this set has been generated, an image may be rendered quickly by simply matching each gray level to the appropriate binary image. The other conventional techniques offer better quality, but all rely upon image-dependent feedback, and require substantially more computation when rendering the image.

Halftoning using a dither array sacrifices some of the qualities of the image-dependent model-based approaches, but offers considerably greater speed when rendering the image. A dither array is a two-dimensional arrangement of numbers used to produce a halftone pattern. In typical applications, the numbers will be integers in the range from zero (0) through two hundred and fifty-five (255), inclusive. To produce a halftone pattern for a gray level "g" in the range of $0 \leq g \leq 255$, every location in the dither array<g will be marked with a dot. Each resulting "dot profile" (i.e., a binary image representing a constant gray level) must necessarily be a subset of all darker dot profiles. Typically, a dither array is created one dot profile at a time.

It is usually impractical to create a dither array as large as the image which is to be rendered. Therefore, the dither array typically is "tiled," or repeated periodically, as many times as needed to cover the image. Accordingly, the dither array must be free of any visual artifacts which would result in periodic patterns. The primary advantage of a dither array is its speed, which is due to the fact that for each pixel in the image, it is necessary to check only a single threshold value in the dither array.

An early dispersed-dot stochastic dither array was an adaptation of Sullivan's minimum visual modulation approach. By imposing the additional constraint that the bit patterns be "correlated" with one another, a dither array could be generated instead of using a set of 256 uncorrelated bit patterns (i.e., dot profiles). This conventional correlation approach was described in U.S. Pat. No. 5,214,517, by Sullivan et al.

A later patent, U.S. Pat. No. 5,111,310, by Parker et al. discloses the use of a blue noise mask. The Parker blue noise mask builds successive levels of the dither array by filtering the Fourier transform of each dot profile with a blue noise frequency distribution. The filtered dot profile is compared against the original dot profile to determine where dots should be added or removed, in order to create the next level (either higher or lower in gray scale level). Ulichney's void-and-cluster algorithm, disclosed in an article titled *The Void-And-Cluster Method for Dither Array Generation*, by R. A. Ulichney provides a fast, simple algorithm for generating a blue noise dither array, based upon the spatial distances between the pixels in each dot profile. Although this method is quick, its quality falls short of the optimal solution. Improvements have been made to both the blue noise mask and the void-and-cluster algorithm, discussed in an article titled *Modified Approach to the Construction of the Blue Noise Mask*, by M. Yao and K. J. Parker, and a patent titled *Halftone Images Using Special Filters*, U.S. Pat. No. 5,317,418, by Qian Lin. Both of these conventional approaches are presently susceptible to local minima, as they are based upon greedy optimization techniques.

SUMMARY OF THE INVENTION

Accordingly, it is a primary object of the present invention to eliminate visual patterns that arise from variations in dot density of dot profiles used in halftoning of digital images.

It is a further object of the present invention to reduce the "cost function," which is the statistical variance of the dot density of dot profiles used in halftoning of digital images, thereby eliminating visual patterns while giving uniform density that does not contain objectionable visual artifacts.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved method for generating a dispersed-dot stochastic dither array used in halftoning is provided using minimum density variance. By minimizing the variation in the distribution of dots in a given dot profile, a pleasing dot profile may be obtained. A dot profile array for a particular gray level is first created, and then a corresponding delta density sum array is created. At each location where the dot profile is equal to one (1), the delta density sum array is shifted so as to be centered at that location. The delta density sum array is added to an initially cleared cumulative density sum array for each location where the dot profile is equal to one (1). The available set of dot locations is then determined, and a pre-determined number of these dot locations is randomly selected as required to create the next gray level. If the next level to be created is an increase in gray level, then the available set of dot locations comprises those locations in the array that have no dot. If the next level to be created is a lower gray level, then the available set of dot locations comprises those locations that already contain a dot.

The randomly selected dot locations will have dots added if the next gray level is to be an increase, or those same randomly selected locations will have dots removed if the next level is to be a decrease in gray level. If increasing one gray level, the delta density sum array is shifted for each of the randomly selected positions to be centered at the randomly selected position, then added to the cumulative density sum array. If decreasing one gray level, the delta density sum array is shifted for each of the randomly selected positions to be centered at the randomly selected position, then subtracted from the cumulative density sum array. The final step is to minimize the variance of the density of the dot profile, using a technique known as "simulated annealing."

Simulated annealing is used to find a dot profile which is nearly optimal with respect to a weighting function based upon the local density variances, and this may be extended to obtain a dither array. Each step of the simulated annealing exchanges the values at a previously selected location and a previously unselected available location in the dot profile. This movement of dots is repeated many times, during which process the variance of the density of the dot profile is calculated to see if each dot movement is an improvement or not. Improvement is part of the criteria for accepting the movement, thus as this iterative process is performed, the variance of the density will gradually decrease, until it has become sufficiently minimized. No Fourier transformations are required using the method of the present invention, and consequently, considerably less computation is needed as compared to conventional methods.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 1A shows a 4×4 dither array.

FIG. 1B shows three correlated dot profiles at three different gray levels.

FIG. 2A shows an example dot profile.

FIG. 5A shows a density array as it is affected by one dot location.

FIG. 5B shows a tiled dot profile containing a single dot which is used in creating the density array of FIG. 5A.

FIG. 6A shows a non-tiled dot profile containing a single dot.

DETAILED DESCRIPTION OF THE PREFERRED EMBODIMENT

Figure 2B:
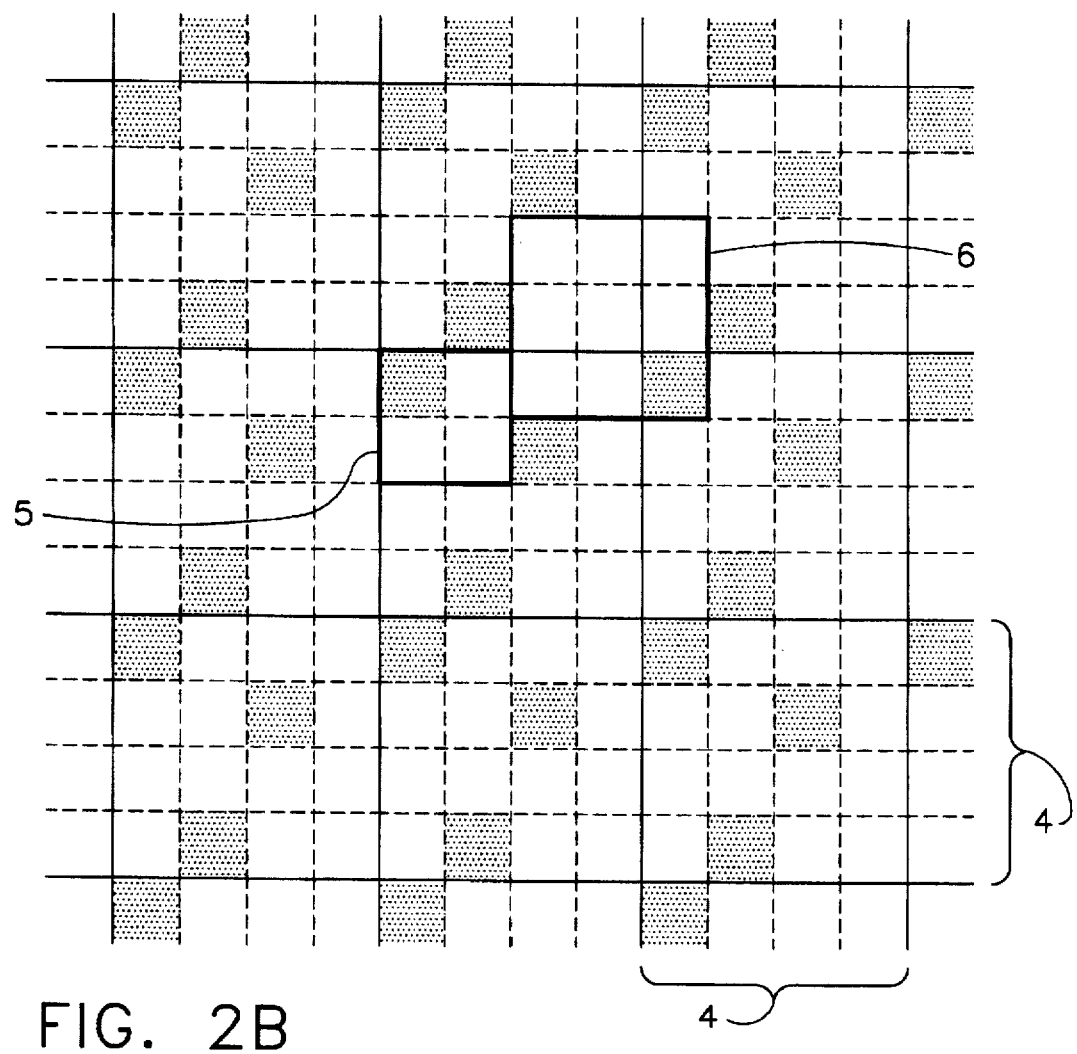
FIG. 2B shows the dot profile of FIG. 2A showing various sample size density measurements.

Reference will now be made in detail to the present preferred embodiment of the invention, an example of which is illustrated in the accompanying drawings, wherein like numerals indicate the same elements throughout the views.

The present invention provides a method for generating a halftone image from a gray scale image using a dither array. The preferred dither array used is a dispersed-dot stochastic dither array, and the halftone image is generated in an efficient manner from the gray scale image by performing a direct comparison of pixel values in the gray scale image to values in corresponding positions of the dither array. The dither array is generated from a set of dot profiles, which are correlated with one another such that all of the dots in a given dot profile are present in all subsequent dot profiles (i.e., at higher gray levels).

Referring now to the drawings, FIG. 1A shows an example of a 4×4 dither array, generally designated by the index numeral 1, and having numeric values in the range of zero (0) through fifteen (15), inclusive. FIG. 1B shows a collection of three of the different dot profiles at three different gray level values used to generate the dither array of FIG. 1A. The dot profile having the index numeral 33 corresponds to a gray level of three (3), which contains three dots out of the sixteen possible locations in the 4×4 dot profile. The dot profile 35 corresponds to a gray level of five (5), and the dot profile 38 corresponds to a gray level of eight (8).

FIG. 2A shows a dot profile designated by the index numeral 4 of size M×N (where M and N both equal 4), which has been tiled repeatedly in FIG. 2B. In FIG. 2B, each tile 4 can be seen bounded by the solid horizontal and vertical lines, and as designated by the brackets corresponding to the index numeral 4. Region 5 is one of M*N different regions of size 2×2 into which the dot profile is subdivided. Region 6 is one of M*N regions of size 3×3. When a region extends beyond the boundary of the M×N array, it wraps around to the opposite side, thus achieving a periodic tiling. In practice, this "wrap-around" may be accomplished by addressing the array elements modulo the array size. In general, the dot profile may be subdivided into M*N different regions of constant size. For all such regions, the number of dots contained within a particular region [m,n] can be counted and used as a measure of dot density at that location.

In the following example, X[m,n] represents the number of dots found in region [m,n]. For the dots to be uniformly distributed across the entire dot profile, the variance of the number of dots in each of the different regions of the dot profile should be as low as possible. The term "variance" is equal to the square of the standard deviation. It is possible for an image to produce a minimal variance and still contain periodic patterns matching the period of the region's size. Therefore, a range of region sizes should be examined when creating a dither array.

Figure 3A:
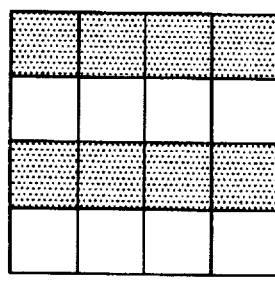
FIGS. 3A, 3B, and 3C show three different 4×4 dot profiles having similar densities.
Figure 3B:
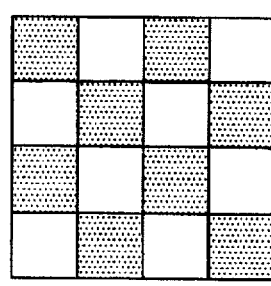
Figure 3C:
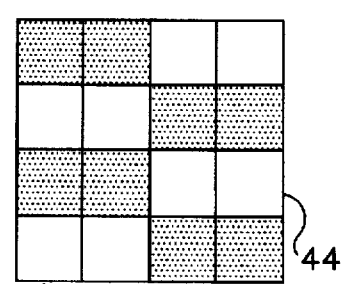

FIGS. 3A, 3B, and 3C show three different 4×4 dot profiles, all having the same number of dots. All 2×2 regions of the dot profile 40 of FIG. 3A have the same number of dots, so its variance is equal to zero (0) (and thus minimal) for this region's size. However, the variance of dot profile 40 for 3×3 regions is not minimal. The dot profile 42 of FIG. 3B shows a pattern in which the 2×2 and 3×3 regions both have minimal variances. Such an image is not unique, as depicted in the dot profile 44 of FIG. 3C, which also has minimal variances for 2×2 and 3×3 regions (albeit the variance is not zero (0) for the 3×3 regions).

Figure 3D:
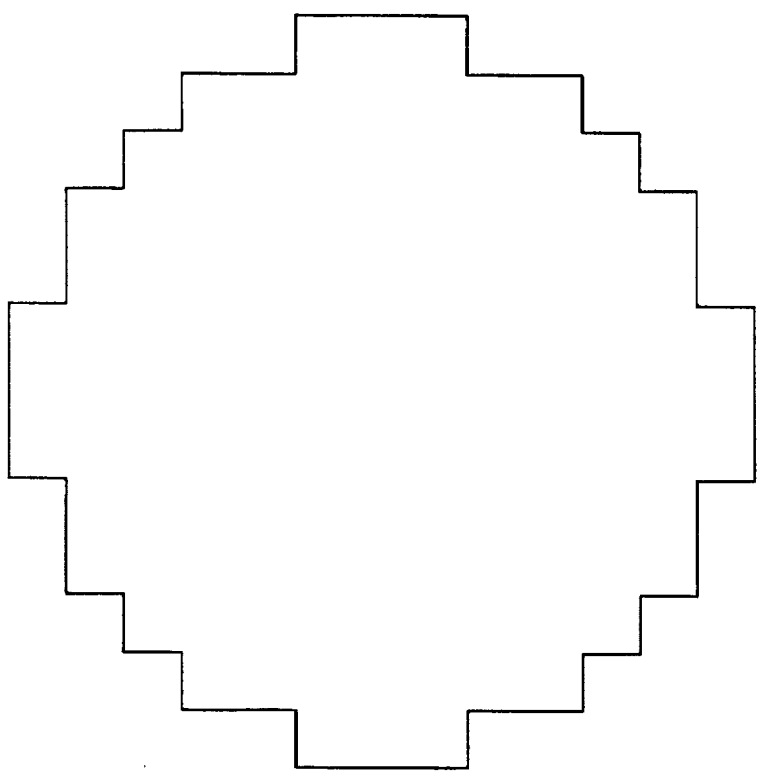
FIG. 3D shows a dot profile of a circular region having a diameter of 13 dots.
Figure 3E:
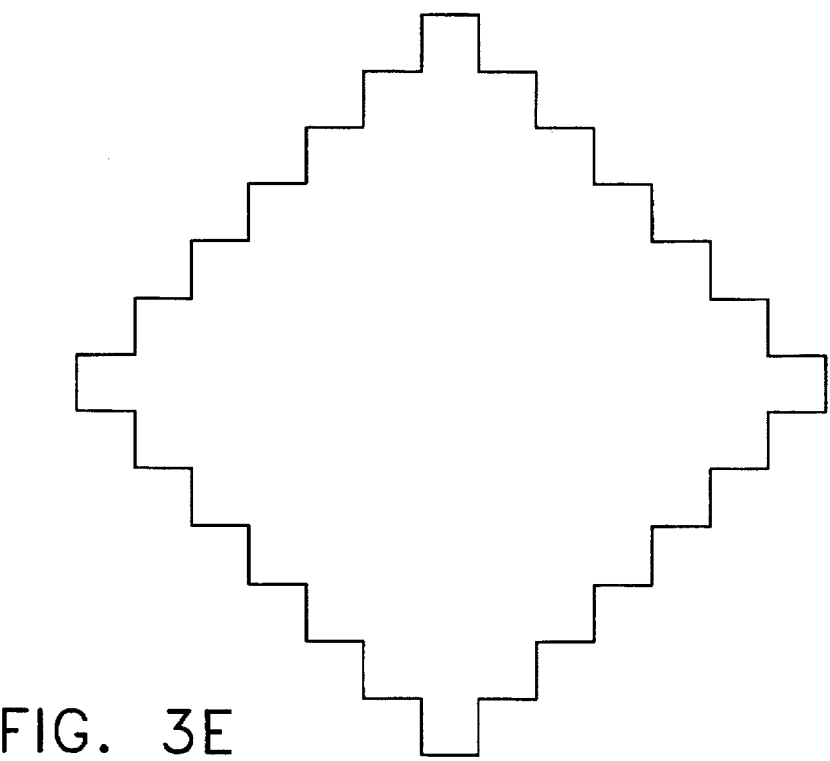
FIG. 3E shows a dot profile of a diamond-shaped region having a diameter of 13 dots.

The shape of the region chosen also has an effect. In FIGS. 3A–3C, the regions were square in shape, however, the regions could instead be circular, as shown in FIG. 3D, or diamond-shaped, as shown in FIG. 3E. Regions having different shapes would yield slightly different results, and in some cases may have advantages.

It is preferred that each new dot profile be created from the previous dot profile. The manner in which the new dot profile will be correlated with the existing one depends upon whether dots will be added or removed. When adding dots, all dots in the existing dot profile will also be present in the new dot profile being created. When removing dots, all empty locations (i.e., locations without a dot) in the existing dot profile will also be present in the new dot profile being created. Given the set of possible choices available within the restrictions of the previous dot profile, the preferred location of the new dots must be determined.

Since it is preferred to eliminate visual patterns that arise from large variations (or a high variance) in the dot density when placing or removing dots, a quantity designated as the "cost function" will be used to determine whether or not an improvement is made when placing or removing a particular dot. The "cost function" is the statistical variance of the above-related density measures, and dots selected such that the cost is minimum provide uniform density without objectionable visual artifacts. In a typical application, a square dot profile may have M×N dimensions of 128×128, thereby providing a total number of dots or pixels of 16,384 (16k). In the instance where the image to be halftoned is a black and white image having gray scale values in the range of 0–255 (i.e., 256 possibilities), then each gray scale level in the dot profile will have 64 dots either more or less than its neighboring gray scale level. For example, at a gray scale of one (1), there would be exactly 64 dots either in the entire 16K dot profile.

It is usually advantageous to initially create a dot profile at a mid-level gray scale level (i.e., at a gray level of 127 or 128), rather than to initially create a dot profile for a gray scale of 1 and then increment all the way through to the final gray scale level of 255. Once the initial mid-level dot profile has been created, the next greater dot profile gray scale level would then be created by adding 64 new dots at locations that previously had no dots. By the same token, to create the dot profiles for the lower gray levels, once the initial mid-level dot profile has been created, its next lower gray level would have 64 fewer dots removed from locations that already had dots at the initially-created level. In this manner, the dot profiles for all of the gray levels can be created by merely adding or removing 64 dots at a time to create each new level.

For example, if the next gray level dot profile is to be created by adding dots, consider the effect of adding a single dot. To start with, only a single region size r is considered, and there will be a total number of n=M*N regions of size r. In the typical case, the value of n will be equal to 128 times 128, which is 16,384. There will be this number of regions regardless of the value of r, i.e., if there are regions that are 2×2, there will be 16,384 of them completely covering the total dot profile having dimensions 128×128. If the region size is 3×3, there will still be 16,384 of them. It will be understood that these regions, regardless of their dimension, will overlap one another. Let the variable X[i,j] be the number of dots found in the region centered at position (i,j). This is the density value of the dot profile at location (i,j). Let the variable X'[i,j] be the number of dots found in the region at position (i,j) after the new dot is added.

Using the variables defined in the above paragraph, the change in variance will be equal to Equation 1, as follows:

EQUATION 1:

$\Delta \text{Variance} =$ $$= \frac{1}{n} \sum_{i=1}^{M} \sum_{j=1}^{N} (X_{i,j}')^2 - \left( \frac{1}{n} \sum_{i=1}^{M} \sum_{j=1}^{N} X_{i,j}' \right)^2 -$$

$$\left[ \frac{1}{n} \sum_{i=1}^{M} \sum_{j=1}^{N} X_{i,j}^2 - \left( \frac{1}{n} \sum_{i=1}^{M} \sum_{j=1}^{N} X_{i,j} \right)^2 \right]$$

Equation 1 has four terms, in which the two left-hand terms are equal to the variance after the new dot has been put in, and the two right-hand terms are equal to the variance before the new dot is put in. The difference between these two quantities, therefore, is equal to the change in variance, which should be minimized to achieve optimal performance in halftoning.

In the analysis presented herein, the variable L[x,y] will refer to the set of all regions that include location (x,y). The value of X[i,j] will be affected by the inclusion of a dot at location (x,y) if and only if region (i,j) is an element of L[x,y]. Thus, X'[i,j]=X[i,j]+1 if location (i,j) is an element of L[x,y] and X'[i,j]=X[i,j] elsewhere:

EQUATION 2:

$$X_{i,j}' = \begin{cases} X_{i,j} + 1 & \text{if } R_{i,j} \in L_{x,y} \\ X_{i,j} & \text{otherwise.} \end{cases}$$

In the case of regions having dimensions 3×3 (i.e., r=3), then p=9, so there will be nine such regions in the set L[x,y]. This is demonstrated by an inspection of FIG. 5B, assuming that the new dot is located at the index numeral 13, there will then be nine such 3×3 regions (overlapping one another) within the 5×5 square designated by the index numeral 14 that each contain the dot 13. In this instance, the set L[x,y] would refer to the set of those nine regions that are contained by the box 14.

There will always be p elements in L[x,y], so there will always be p instances in which X'[i,j]=X[i,j]+1. Therefore, Equation 1 may be rewritten as shown below:

EQUATION 3:
$\Delta \text{Variance} =$ $$= \frac{1}{n} \sum_{i=1}^{M} \sum_{j=1}^{N} (X_{i,j}')^2 - \left( \frac{1}{n} \left( p + \sum_{i=1}^{M} \sum_{j=1}^{N} X_{i,j} \right) \right)^2 -$$

$$\left[ \frac{1}{n} \sum_{i=1}^{M} \sum_{j=1}^{N} X_{i,j}^2 - \left( \frac{1}{n} \sum_{i=1}^{M} \sum_{j=1}^{N} X_{i,j} \right)^2 \right]$$

The second and fourth terms no longer depend upon the location of the new dot. Removing them from Equation 3 gives the following equation:

EQUATION 4:

$$\Delta V = \sum_{i=1}^{M} \sum_{j=1}^{N} (X_{i,j}')^2 - \sum_{i=1}^{M} \sum_{j=1}^{N} X_{i,j}^2 =$$

$$= \begin{cases} \sum_{i=1}^{M} \sum_{j=1}^{N} [(X_{i,j} + 1)^2 - X_{i,j}^2] & \text{if } R_{i,j} \in L_{x,y} \\ \sum_{i=1}^{M} \sum_{j=1}^{N} [X_{i,j}^2 - X_{i,j}^2] = 0 & \text{otherwise} \end{cases}$$

-continued $$= \begin{cases} \sum_{i=1}^{M} \sum_{j=1}^{N} (2X_{i,j} + 1) & \text{if } R_{i,j} \in L_{x,y} \\ 0 & \text{otherwise} \end{cases}$$

After removing the unnecessary constants of Equation 4, the following equations may be obtained:

EQUATION 5:

$$\text{density sum}[i,j] = \sum_{R_{i,j} \in L_{x,y}} X_{i,j}$$

When adding dots (to create the next greater gray scale level), this quantity should be as small as possible. Conversely, when removing dots, the location of regions having the greatest dot density should be chosen.

Noting that the above derivation applies to a single region size, Equation 5 may be further generalized as shown below, where the variable R will represent the number of different region sizes. The "cost" (a measure of the total variance for all regions when considering all region sizes) will be minimized when adding dots, and maximized when removing dots, as follows:

EQUATION 6:

$$\text{cost } [i,j] = \Sigma \text{density sum}[i,j]_r$$

The overall cost function in this analysis is defined as a function of the individual costs. In the above analysis, an equally weighted sum of the individual costs was used, however, this cost function could be chosen to customize the behavior of the method of the present invention across the range of individual region sizes. Therefore, the cost function is represented by the following Equation 7:

EQUATION 7:

$$\text{cost } [i,j] = f(\text{density sum}[i,j]_1, \ldots, \text{density sum}[i,j]_R)$$

This cost function, as noted above, could merely be a sum of the individual costs, or could be a weighted summation, as given in the following example:

EQUATION 8:

$$\text{cost}[i,j] = \sum_{r=1}^{R} \text{density sum } [i,j]_r * \text{weight}_r$$

Figures 4A, 4B:
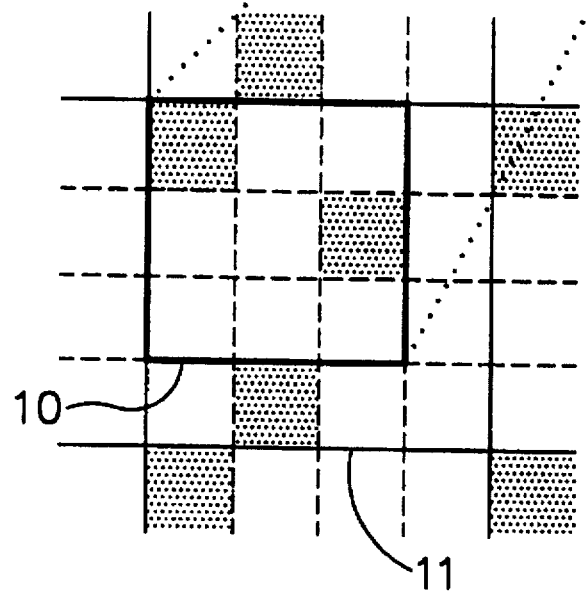
FIG. 4A shows a density array for 3×3 regions.
FIG. 4B shows a tiled dot profile showing the 3×3 region used as the center of the example density array of FIG. 4A.

In order to evaluate the cost function, the number of dots in every affected region of each region size must be known. There will be M*N distinct regions (e.g., 128*128) for each region size. The number of dots in each individual region may be stored in an M×N array, which is referred to as a "density array." Considering only a single region size of 3×3, FIG. 4A shows the correspondence between a single element 8 of such an array 9, and the 3×3 region 10 of a dot profile 11 on FIG. 4B. FIG. 5B shows a tiled dot profile 12 containing a single dot 13. The extent of all 3×3 regions affected by this single dot 13 is a square designated by the index numeral 14. FIG. 5A shows a tiled density array 16, and the regions 14 of FIG. 5B correspond to the 9 elements depicted by the index numeral 15 shown in the tiled density array 16. The number and position of regions that will be affected by a particular dot location is determined by the size and shape of the region.

Figures 5C, 5D, 6B, 6C:
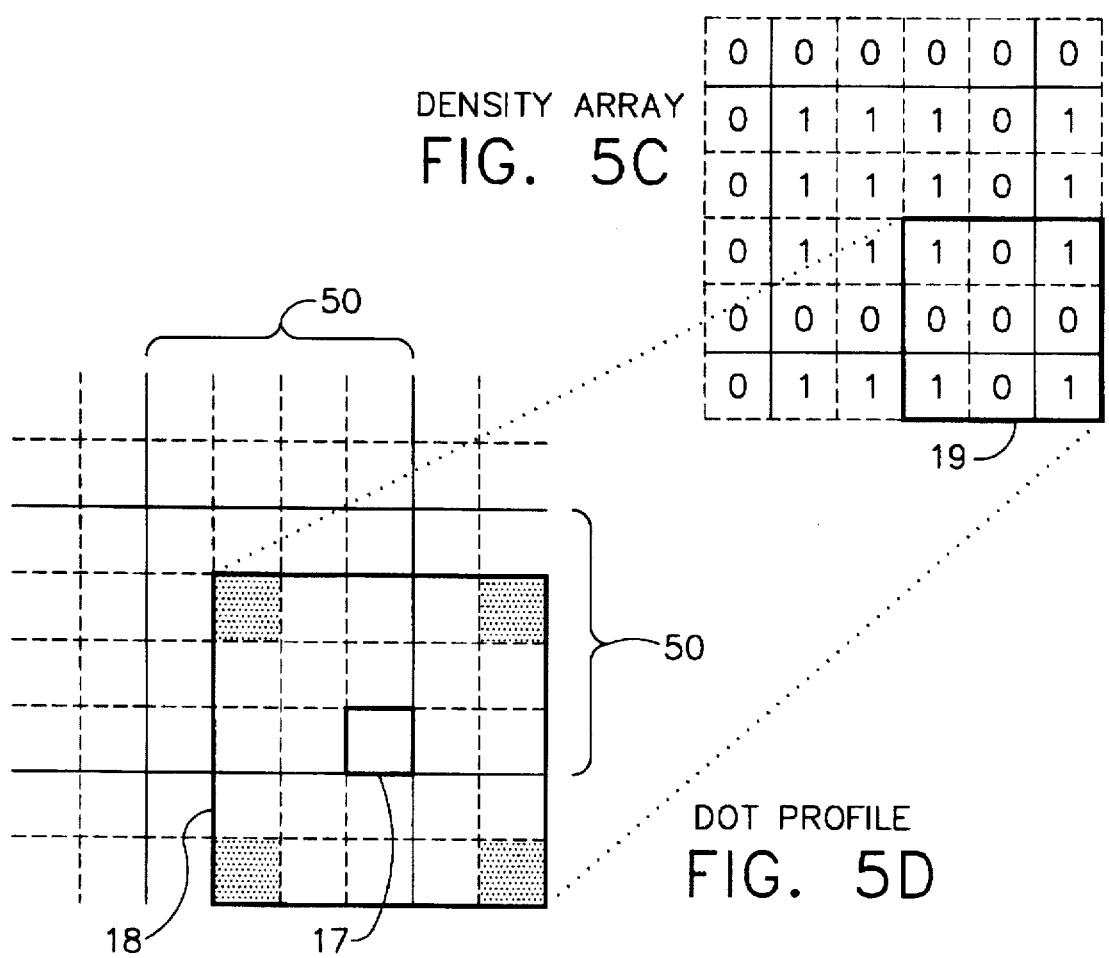
FIG. 5C shows a density array highlighting a different location where a dot may be added.
FIG. 5D shows a tiled dot profile centered on the location where a dot may prospectively be added as shown in FIG. 5C.
FIG. 6B shows a density array based upon 3×3 square regions.
FIG. 6C shows a 4×4 density sum array based on 3×3 square regions.

FIG. 5D shows the same tiled dot profile as in FIG. 5B. However, a different location 17 is marked in the dot profile. If a dot were added to location 17, then the set of 3×3 regions within the square designated by the index numeral 18 would be affected. These affected 3×3 regions correspond to the set of elements 19 in the tiled density array of FIG. 5C. If a dot were added to location 17, these 9 elements 19 would each be incremented by 1. Equation 5 indicates that dots should be chosen for inclusion in the dot profile such that the sum of the density values incremented will be minimal.

FIG. 6C depicts a density sum array designated by the index numeral 20. Each element of density sum array 20 stores the sum of the density values that would be modified by the inclusion of a dot at the corresponding location of the dot profile. For example, dot element 21 is the sum of the values in the set of density array elements 15 (see FIG. 5A), which corresponds to the inclusion of dot 13 in dot profile 12 (see FIG. 5B). Selection of empty location 17 (see FIG. 5D) for inclusion of another dot is justified by the fact that the value of its corresponding location 22 (see FIG. 6C) in the density sum array 20 is a minimum. In this case, the minimum value in the density sum array is equal to four (4), and the fact that several locations are minimal indicates the need for using additional region sizes.

Once a dot is selected for inclusion, the dot profile, affected densities, and density sums must be updated. For the density data, an array of size M×N×R (where R is the number of region sizes) can completely represent all necessary data. Once a location has been chosen for adding or removing a dot, the statistics in the three-dimensional array M×N×R need to be updated. This requires M*N*P increment operations, where P is expressed below in Equation 9:

EQUATION 9:
$$P = \sum_{r=1}^{R} P_r$$

The variable $P_r$ is the number of pixels in a region of size r. The cost function may be re-evaluated using Equation 7, requiring on the order of M*N*P operations. If the cost function is re-evaluated in this manner, a maximum amount of work will be required. However, the storage space and computation time may both be reduced substantially by evaluating the incremental change of the weighting function of Equation 8 for adding or removing a single dot. This procedure reduces the storage requirements to a single M×N array, for storing the cumulative results of Equation 8 for the entire image.

Figure 7:
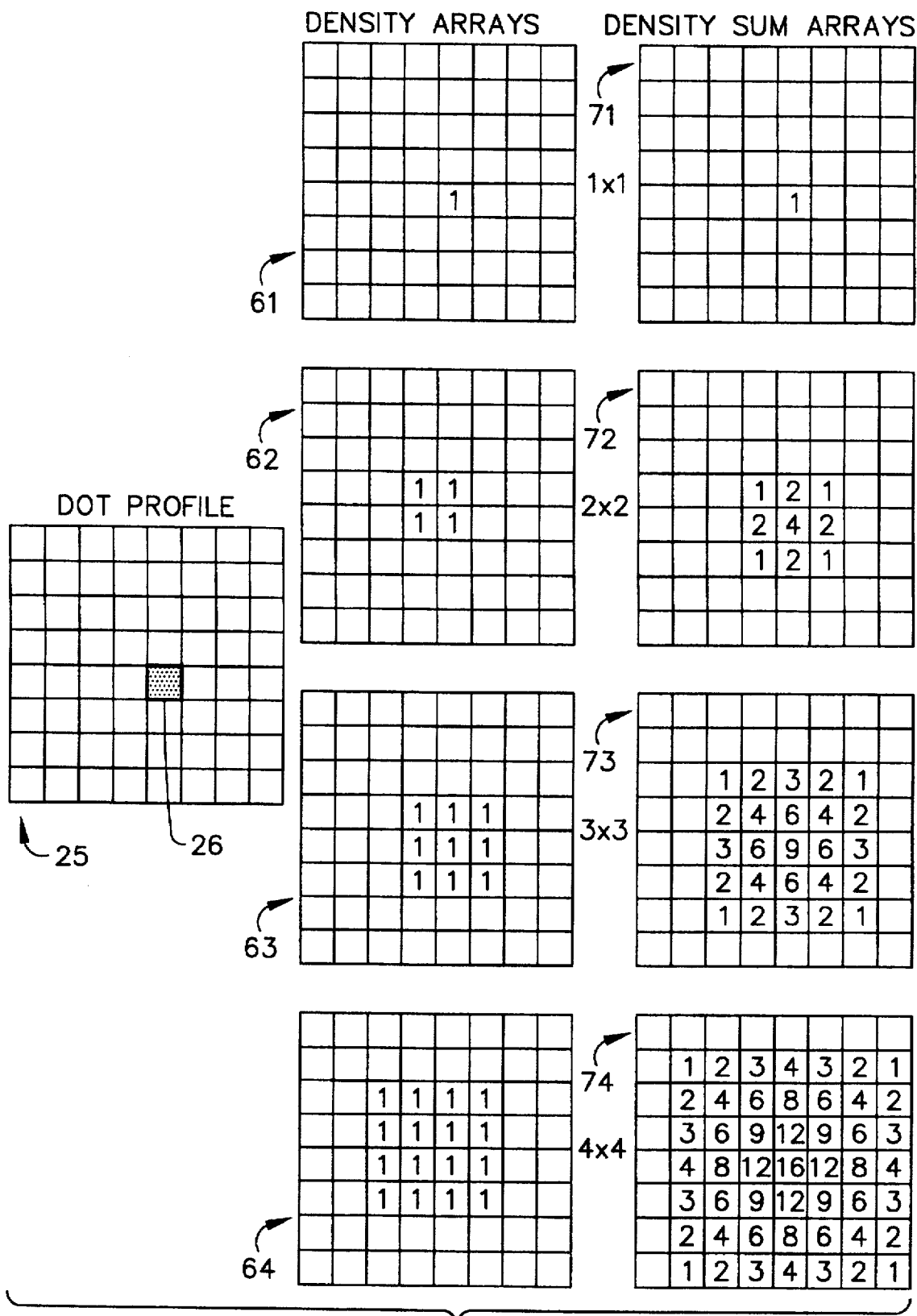
FIG. 7 shows the effect of single dot in a dot profile on density arrays and density sum arrays for different sample sizes.

FIG. 7 depicts a dot profile designated by the index numeral 25 which contains a single dot 26. A series of four different density arrays 61–64 and four different density sum arrays 71–74 are also shown on FIG. 7, which correspond to different region involving sizes for dot profile 25. The values in these arrays indicate the effect of adding a single dot to position 26 of a dot profile, for region sizes 1×1 through 4×4. In FIG. 7, an empty location indicates a value of zero. If the position of the dot were to be shifted, the values in the density sum arrays would undergo a corresponding positional offset modulo the array size.

Figure 8:
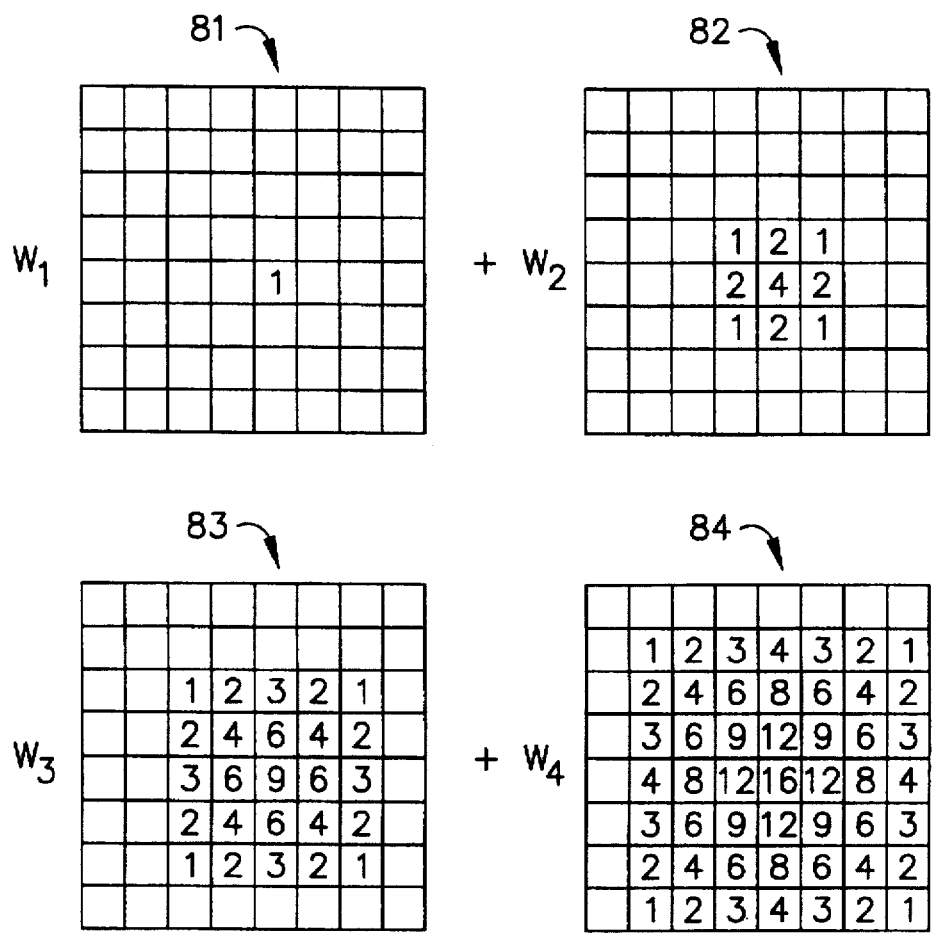
FIG. 8 shows the formation of the delta density sum array based on density sum arrays for different region sizes.
Figure 8:
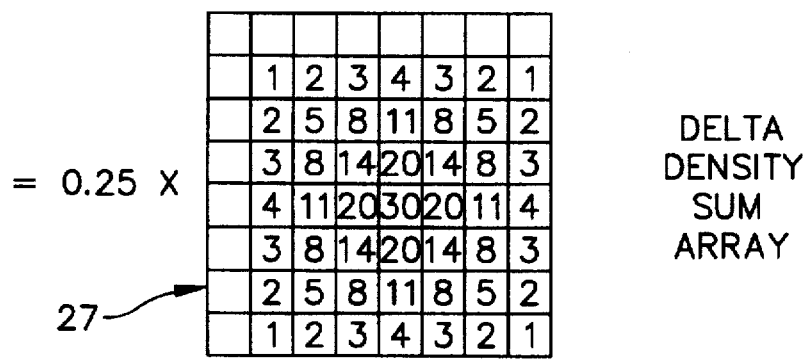

FIG. 8 shows a "delta density sum" array depicted by the index numeral 27, which is the matrix sum of the density sum arrays each multiplied by a weighting factor. (In FIG. 8, the weighting factor is 0.25 for each of the four density sum arrays.) In FIG. 8, an empty location indicates a value of zero. The result is a weighted average across all region sizes affected by the adding of a single dot to a specific position of the dot profile. The density sum array can be updated by a single matrix addition of the delta density sum array. The offset between the position of the dot being added and position 26 (see FIG. 7) determines a corresponding positional offset to the delta density sum array values. The density sum arrays 81–84 on FIG. 8 correspond to the density sum arrays 71–74 on FIG. 7.

Although the above example uses square region shapes, other shapes and sizes are easily accommodated within the principles of the present invention. Circular region shapes (see FIG. 3D) would give an isotropic increment function. Diamond region shapes (see FIG. 3E) would be a good choice because of the sensitivity of the human visual system to horizontal and vertical linear features, and diamond-shaped regions would tend to decrease the likelihood of selecting locations which would form linear features in the horizontal and vertical directions. Furthermore, the various sizes of regions do not need to all be the same shape, and an arbitrary collection of region shapes and sizes may be handled efficiently according to the principles of the present invention.

Using the above-related optimization criterion, dots may be added to or removed from a particular dot profile to obtain darker or lighter dot profiles. To create a dither array, the corresponding location within the dither array will be labeled with an appropriate threshold value (i.e., gray level). Corresponding to the above-related explanation of a dither array, the threshold value may be determined by an Equation 10, below. In Equation 10, the numerator is the total number of dots in the image, whose dimensions are M×N. The number of gray levels typically is equal to 256. Another more general approach could be to select the threshold value based upon the perceived tone of the actual rendered dot profile, rather than based upon the number of dots.

EQUATION 10:

$$\text{Threshold} = \text{integer}\left( \frac{\text{number of dots} - 1}{M*N} * \text{number of gray levels} \right)$$

When adding or removing a dot, the selection of a single location which produces the minimum variance will give good results. However, such a "greedy" approach is unlikely to give optimal results across the entire range of gray levels. Since the goal is the appearance of a particular gray level, the variance produced by a single dot is not as important as the variance produced by the complete set of dots needed to reach the next gray level. A greedy approach attempts to minimize the variance of the complete dot profile by selecting individual dots whose contribution to the variance is minimal. Such an approach tends not to reach a globally optimal solution, even though the choice of each dot is the best currently available. Since subsequent locations will be constrained by previous selections, selecting the best location for the present dot may lead to worse results in the future selections.

An exhaustive search of all possible dot combinations is prohibitive, but would produce the single best result possible (i.e., the globally optimal solution). The minimization method of steepest decent (the "greedy" approach) may reach a good solution, but not necessarily the best solution since once it has chosen a dot that is not part of the best solution, it will fail to reach the globally optimal dot profile. Better results may be obtained with a method that avoids local minima in its search for a global minimum. "Simulated annealing" is such a method.

Simulated annealing is analogous to a metallurgical process of slowly cooling metal to increase its strength. In simulated annealing, the randomness of a given system is slowly decreased or "cooled," allowing the process to escape local minima and achieve a globally optimal state. This randomness provides a means of accepting a temporary increase in the cost function, which is necessary to escape from a local minimum. As the temperature decreases, so does the probably of accepting a given increase in costs, which assures convergence. Equation 11, below, shows the Boltzmann distribution, which is used to model the randomness, where T is the current temperature and x is the amount by which the cost is increased.
EQUATION 11:

$$f(x)=e^{-x/T}$$

Figure 9:
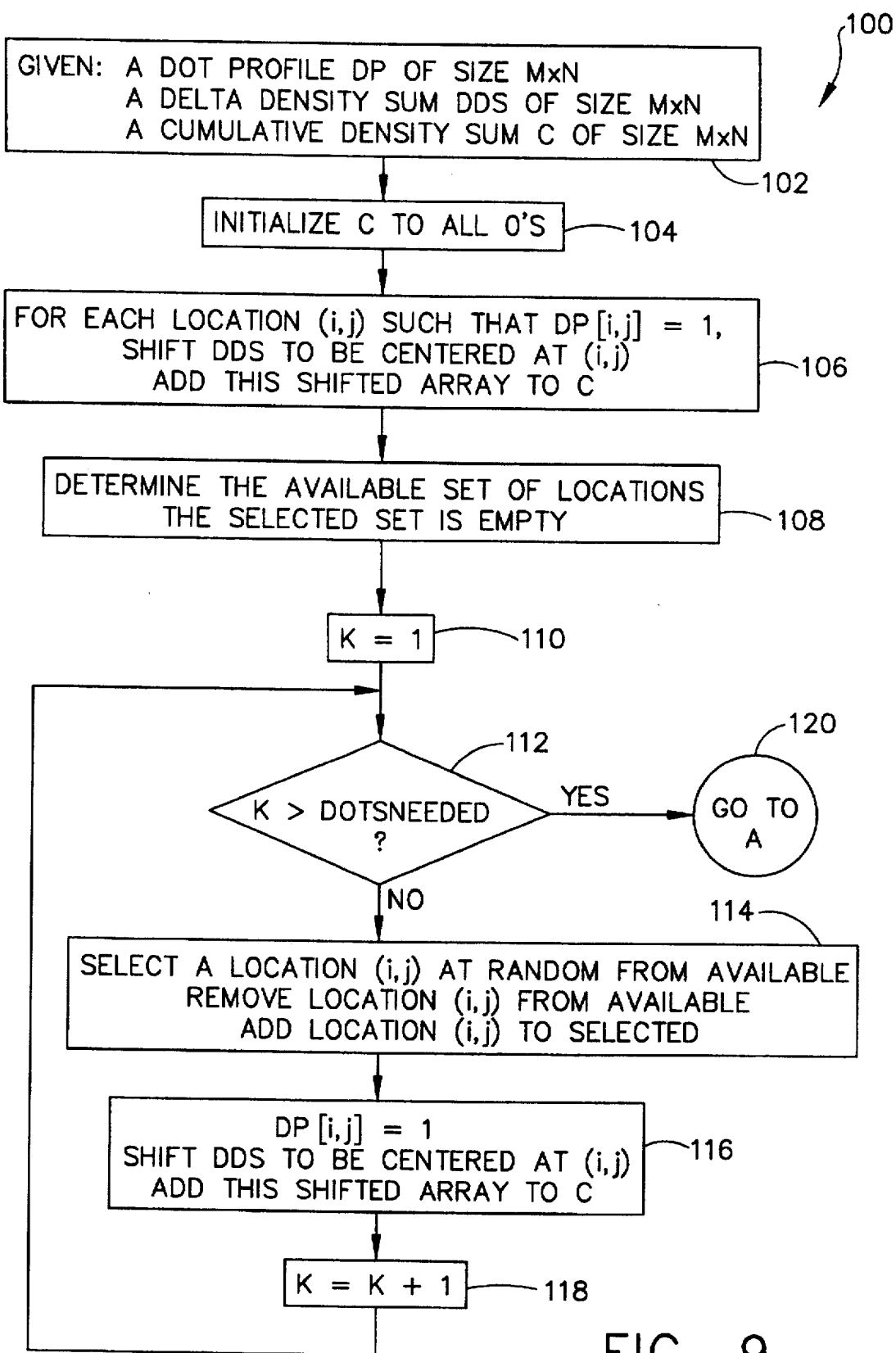
FIG. 9 is a flow chart depicting the initial method steps for determining one gray level according to the principles of the present invention.
Figure 10:
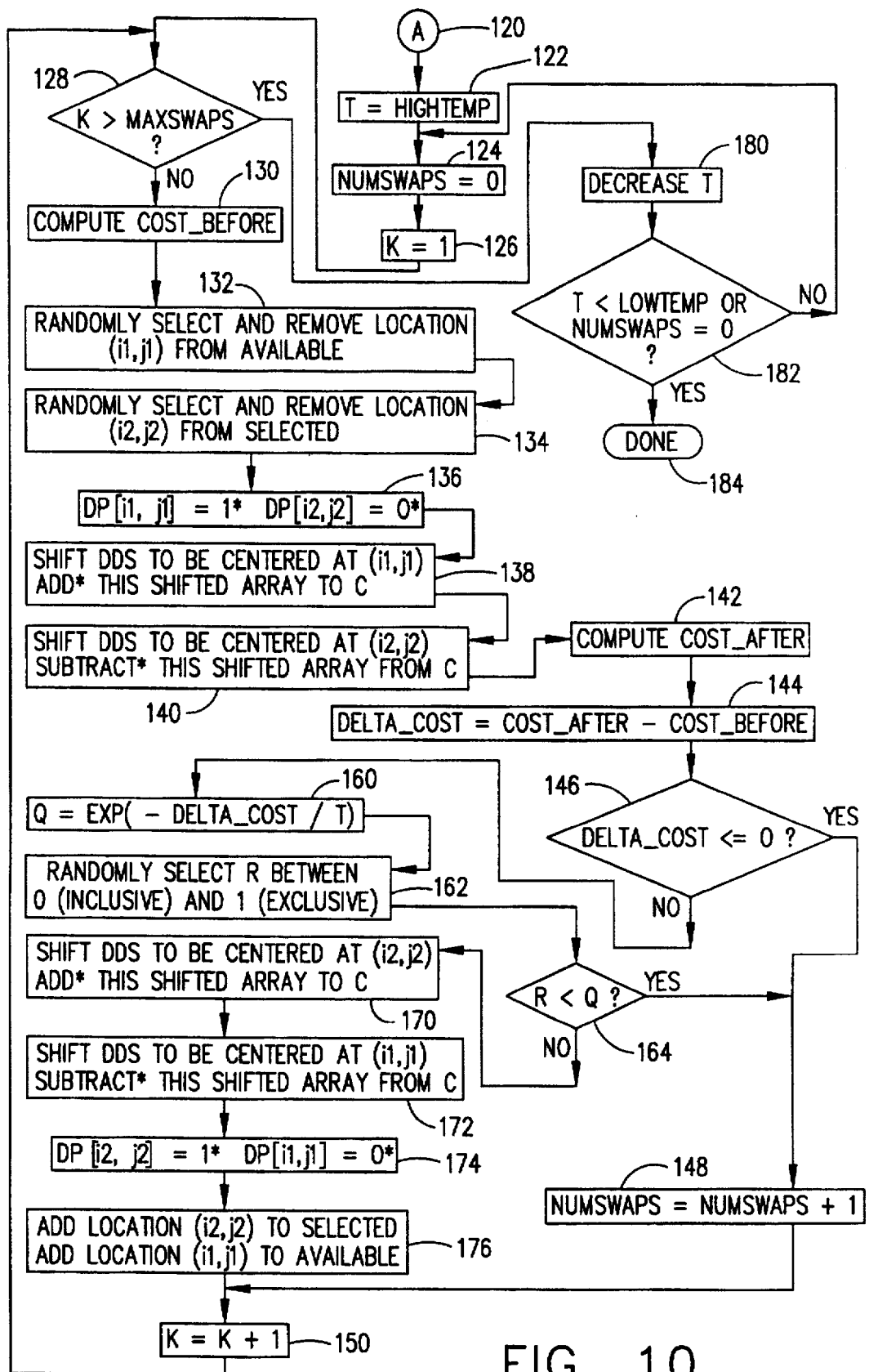
FIG. 10 is a flow chart depicting the remaining method steps for determining one gray level according to the principles of the present invention, including the steps of simulated annealing.

FIG. 9 is a flow chart that illustrates the process of changing the dot profile by one gray level. FIG. 10 shows a flow chart of simulated annealing, which refines the selection of each dot profile.

The process according to the present invention begins with a given dot profile which may be arbitrarily selected. Depending upon whether a darker or lighter dot profile is desired, enough dots are either added or removed to change the gray shade by one level. For a 128×128 dither array representing 256 uniformly spaced gray levels, this requires 64 dots per level. Typically, an initial dot profile would be created, then dots added until the image becomes completely black. Then the initial dot profile would be restored, and dots removed until the image becomes completely white. In the flow chart of FIGS. 10 and 11, it is assumed that dots should be added, however, only minor changes are required to convert certain method steps to remove dots (rather than adding them). These minor changes will be described as needed hereinbelow, and such affected statements are marked with asterisks on FIGS. 9 and 10.

On FIG. 9, the initial portion of the overall flow chart is designated by the index numeral 100, and this includes the portions that are not part of the simulated annealing method steps. At function block 102, a dot profile "DP" of size M×N is created, and the presence of a dot is marked with a one (1), and the absence of a dot is marked with a zero (0). In addition, a delta density sum "DDS" of size M×N is created, and a cumulative density sum C of size M×N is created. At function block 104, the cumulative density sum C is initialized to all zeros.

At function block 106, for each dot location (i,j) in the dot profile DP, the delta density sum DDS function is shifted so that it is centered at (i,j). This shifted array is added to the cumulative density sum array C, so C contains the cumulative sum of the weighting function of Equation 8 evaluated for each dot in the dot profile DP.

The "available" set of locations is determined at function block 108, which stores unique references to those locations within the dot profile DP that are eligible to be changed. If dots are being added, these locations must already be equal to zero (0), but it may be desirable to impose additional restrictions. If dots are being removed, these locations must be set to one (1). The "selected" set is then initialized to null at function block 108.

To obtain the new dot profile, a designated number of dots must be changed. If the gray shade changes uniformly and the next gray level is being produced, then the number of dots needed ("dotsneeded") will be M*N/number of levels, and will be determined by decision block 112. Otherwise, "dotsneeded" may be chosen as a function of the gray shade to be generated. A number of entries equal to "dotsneeded" are selected from the "available" set and moved to the "selected" set, at function block 114. For each of these entries, the delta density function is shifted at function block 116 so that it is centered at the given position, and this shifted array is added to the cumulative density sum array C. If removing dots, the shifted delta density array will instead be subtracted, and the dots at these locations are reversed in the dot profile. The variable K at blocks 110, 112, and 118 is shown on the flow chart 100 as being part of a generic "FOR" loop in computer programming parlance, and a generic computer program for performing the method of the present invention is listed hereinbelow.

The manner in which the "selected" set is determined affects the quality of the resulting dot profile. The selection of these locations is governed by the cost function, which should be minimized for the entire dot profile. Because an exhaustive search is too time consuming, a minimization approach is advised, and preferably, simulated annealing is used. In general, it is preferred that all 64 dots of the next gray shade level be added to the dot profile at locations that are randomly selected from the "available" set (as per function block 114). It is only after all of these 64 dots have been added that the simulated annealing operation is to take place, evaluating the new dot positions of each of the 64 dots, one dot at a time. In general, each new dot is provisionally moved to another "empty" location to see if the overall cost is improved or increased. A certain maximum number of iterations will preferably be selected for determining if any one of the 64 dots should be moved or left in the initially, randomly-selected position.

The details of the simulated annealing method steps are provided in the flow chart of FIG. 10, starting at step 120 and finishing at step 184. The minimum density variance, subject to the weighting function of Equation 8, is evaluated for the dot profile from the cumulative density sum array at function block 130. A pair of locations is chosen at random, one each from the "available" and the "selected" sets. The dots at these two locations are interchanged by function block 132, 134 and 136, and the cumulative density sum array is updated by adding the shifted delta density function where the dot was added and subtracting the shifted delta density function where the dot was removed by function blocks 138 and 140. The cost function is then re-evaluated from the cumulative density sum array C at function block 142. If the cost has been improved, then the swap will be retained at decision block 146. Otherwise, the swap may still be kept if the Boltzmann distribution (Equation 11) is greater than a random value between zero and one, so the swap could be retained even though it actually worsens the cost at function blocks 160 and 162, and decision block 164. If the swap is not retained, then the dot profile and cumulative density sum arrays are restored to their prior contents, as are the "available" and "selected" sets by function blocks 170, 172, 174, and 176. After a fixed number of swaps in which the temperature is decreased, if the temperature has reached a certain minimum or if no locations were swapped, then the procedure terminates at decision block 182.

Trade-offs and experimentation are involved in the selection of parameters for the starting and ending annealing temperatures and the maximum number of swaps, as well as the selection of how to decrease the temperature (e. g., linear versus non-linear cooling). A slower cooling rate takes more time, but increases the optimality of the solution. Likewise, a large number of swaps takes more time, but improves the cost of the solution. In one experiment, an initial temperature was selected to assure that a large majority of swaps would be accepted at first, and the temperature was decreased by 5% on each iteration. In this example, the number of swaps always reached zero before the minimum temperature was reached. Reasonable variations on these parameters would be expected to give comparable results.

The choice of eligible locations in the "available" set optionally may be restricted, using "target" dot profiles which may be used to guide the selection of locations in a particular manner. Only dots which are present in such a target dot profile may be considered for the "available" set, assuming that dots should be added. If removing dots, then the "available" set is restricted such that the locations are vacant in the target dot profile. Because the target dot profiles may possess certain desirable traits, this approach improves the quality of the dither array. It will be understood that the choice of region sizes and shapes, as well as their particular weighting, should be compatible with these desired traits.

The target dot profiles may not be adaptable to the characteristics of a particular display device, typically a printer. In a physical printing system, isolated pixels may be difficult to print at the finest resolution. By providing target dot profiles which minimize isolated pixels, the method of selecting swap locations may be guided similarly. The smallest region size should be adjusted to the desired size of the smallest cluster. The advantage is that the target dot profiles do not need to be constrained as strictly as the dither array.

Another use of target dot profiles is to relieve the requirement that dot profiles be generated in consecutive order. For example, suppose there exists a dot profile for gray level 64. Rather than generating the dot profile for the adjacent level 65 next, a higher level could be generated instead, such as level 128. The dot profile for level 128 could then be used as a target dot profile, for generating dot profiles between levels 65 and 127, inclusive, from the original level 64 dot profile. In this circumstance, the flow chart at function block 108 (see FIG. 9) would be constrained to choose, while determining the "available" set of locations, from those dot locations that exist in the level 128 dot profile.

For consistency with previously assigned threshold values, all white pixels in the dot profile should be present in the target when removing dots, and all black pixels should be present when adding dots. Otherwise, the target dot profiles are unrestricted. As the gray level of the dither array approaches that of the target dot profile, another target dot profile with a different gray level may be provided in order to prevent the dither array from mimicking the former target dot profile too closely.

Figure 11:
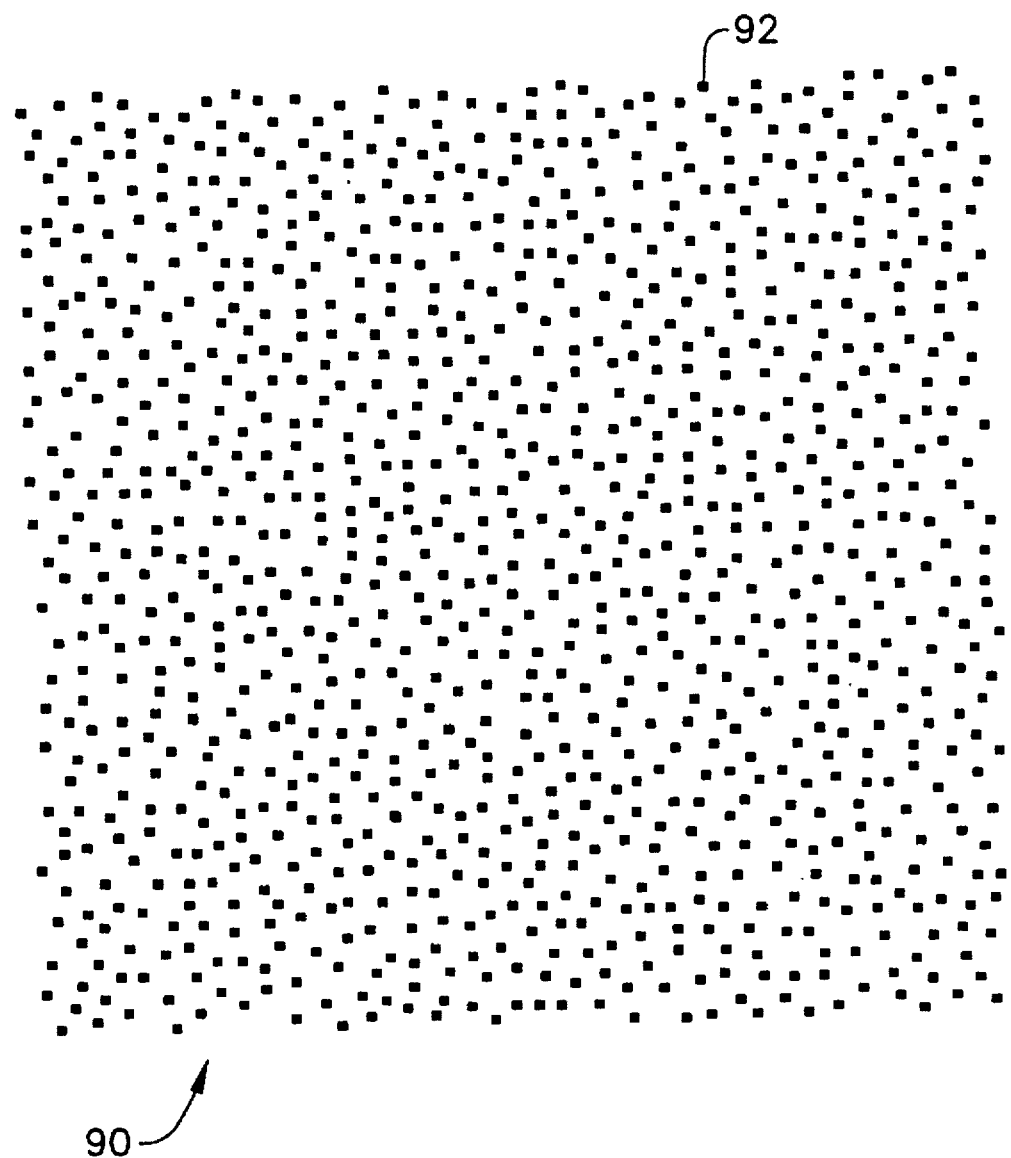
FIG. 11 shows an example of a resulting dot profile for one gray level.

FIG. 11 shows an example of a 128×128 dot profile generated by the minimum density variance method, printed at a resolution of approximately 25 dots per inch. In this example, circular regions were used with a maximum radius of 5 pixels. The density functions were combined with equal weighting. As indicated by this illustration, the dots are dispersed uniformly without the presence of objectionable visual artifacts.

A generic computer program follows below, showing the major commands for implementing the method of the present invention. One of ordinary skill will be able to easily correlate this computer program with the flow charts on FIGS. 9 and 10, and the "line numbers" to the left of the computer program listing correspond to the index numerals on FIGS. 9 and 10. The asterisks designate locations where opposite logic is to be used when removing dots (to create a lower gray level). For example, at line 136, the result would be changed from 1 to 0; and on line 138, a subtraction would occur instead of an addition.

```
(102)        given an MxN dot profile DP
             given an MxN delta density sum function DDS
             given an MxN cumulative density sum array C
(104)        initialize C to all 0's
(106)        for all i
                for all j
                    if DP [i,j] = 1 then
                        shift DDS array so that it is centered at
                            (i,j)
                        add this shifted array to C
                    endif
                endfor
             endfor
(108)        determine the set of available locations such that
                DP [i,j] = 0 and DP [i,j] may be changed to 1 (if
                    adding dots), or
                DP [i,j] 1 and DP [i,j] may be changed to 0 (if
                    removing dots)
(110, 112, 118)  initialize the selected set to null for k = 1 to dotsneeded
(114)            select a location (i,j) at random from the available
                    set
                 remove location (i,j) from the available set
                 add location (i,j) to the selected set
(116)            DP [i,j] = 1
                 shift DDS array so that it is centered at (i,j)
                 add this shifted array to C
             end for
(122)        T = hightemp
             repeat
(124)            numswaps = 0
(126, 128, 150)
                 for k = 1 to maxswaps
(130)                compute cost_before
(132)                randomly select and remove (i1, j1) from the avail-
                        able set
(134)                randomly select and remove (i2, j2) from the
                        selected set
(136)                DP [i1, j1] = 1*
                     DP [i2, j2] = 0*
(138)                shift DDS array so that it is centered at (i1, j1)
                     add* this shifted array to C
(140)                shift DDS array so that it is centered at (i2, j2)
                     subtract* this shifted array from C
(142)                compute cost_after
(144)                delta_cost = cost_after - cost_before
(146, 148)           if (delta_cost <= 0 ) then  # keep the improvement
                         numswaps = numswaps + 1
                     else
(160)                    q = exp ( − delta_cost/T )
(162)                    r = a random number between 0 and 1
(164, 148)               if (r < q) then   # keep anyway, even though
                                               it's worse
                             numswaps = numswaps + 1
                         else          # don't keep-undo the swap
(170)                        shift DDS array so that it is centered at
                                 (i2, j2)
                             add* this shifted array to C
(172)                        shift DDS array so that it is centered at
                                 (i1, j1)
                             subtract* this shifted array from C
(174)                        DP [i2, j2] = 1*
                             DP [i1, j1] = 0*
(176)                        add (i2, j2) to selected set
                             add (i1, j1) to available set
                         endif
                     endif
                 endfor
(180)            decrease T
(182)        until (T < lowtemp or numswaps = 0)
```

Figure 12:
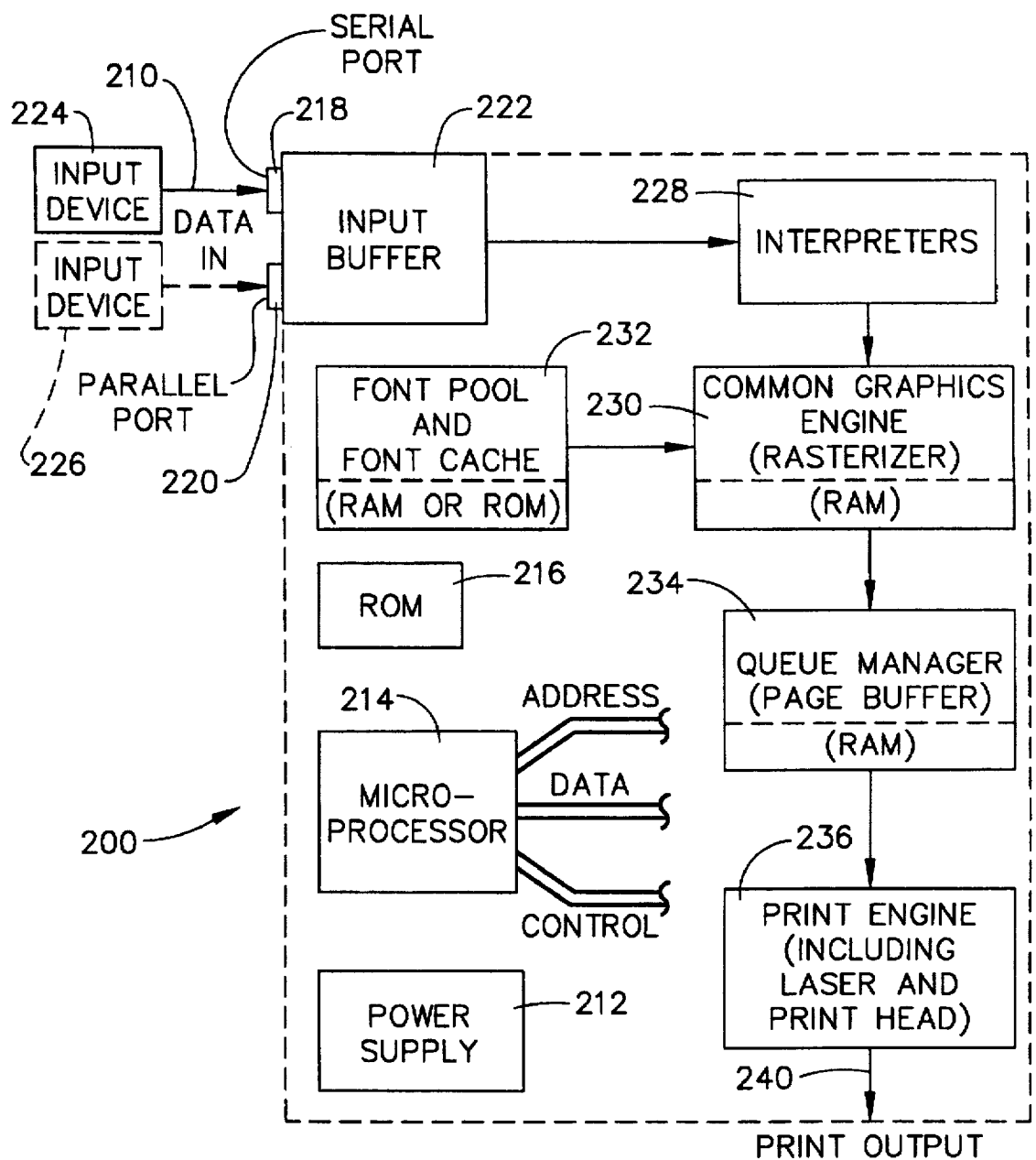
FIG. 12 is a hardware block diagram of the major components used in a laser printer that uses a halftoning dither array designed according to the principles of the present invention.

FIG. 12 shows a hardware block diagram of a laser printer generally designated by the index numeral 200. Laser printer 200 will preferably contain certain relatively standard components, such as a DC power supply 212 which may have multiple outputs of different voltage levels, a microprocessor 214 having address lines, data lines, and control and/or interrupt lines, Read Only Memory (ROM) 216, and Random Access Memory (RAM), which is divided into several portions for performing several different functions.

Laser printer 200 will also contain at least one serial input or parallel input port, or in many cases both types of input ports, as designated by the index numeral 218 for the serial port and the index numeral 220 for the parallel port. Each of these ports 218 and 220 would be connected to a corresponding input buffer, generally designated by the index numeral 222 on FIG. 12. Serial port 218 would typically be connected to a serial output port of a personal computer or a workstation that would contain a software program such as a word processor or a graphics package or computer aided drawing package. Similarly, parallel port 220 could also be connected to a parallel output port of the same type of personal computer or workstation containing the same type of programs, only the data cable would have several parallel lines, instead of only a pair of wires that makes up many serial cables. Such input devices are designated, respectively, by the index numerals 224 and 226 on FIG. 12.

Once the text or graphical data has been received by input buffer 222, it is commonly communicated to one or more interpreters designated by the index numeral 228. A common interpreter is PostScript, which is an industry standard used by most laser printers. After being interpreted, the input data is typically sent to a common graphics engine to be rasterized, which typically occurs in a portion of RAM designated by the index numeral 230 on FIG. 12. To speed up the process of rasterization, a font pool and possibly also a font cache is stored, respectively, in ROM or RAM within most laser printers, and these font memories are designated by the index numeral 232 on FIG. 12. Such font pools and caches supply bitmap patterns for common alphanumeric characters so that the common graphics engine 230 can easily translate each such character into a bitmap using a minimal elapsed time.

Once the data has been rasterized, it is directed into a queue manager or page buffer, which is a portion of RAM designated by the index numeral 234. In a typical laser printer, an entire page of rasterized data is stored in the queue manager during the time interval that it takes to physically print the hard copy for that page. The data within the queue manager 234 is communicated in real time to a print engine designated by the index numeral 236. Print engine 236 includes the laser and the print head, and its output is the physical inking onto a piece of paper, which is the final print output from laser printer 200. It will be understood that the address, data, and control lines are typically grouped in buses, and which are physically communicated in parallel (sometimes also multiplexed) electrically conductive pathways around the various electronic components within laser printer 200. For example, the address and data buses are typically sent to all ROM and RAM integrated circuits, and the control lines or interrupt lines are typically directed to all input or output integrated circuits that act as buffers.

When a digital image is received (via input buffer 222) that requires halftoning so as to be printed by laser printer 200, the dither array created by the above-related process is used repeatedly over the entire incoming image to create a halftoned result. This process occurs in the common graphics engine 230, as part of the rasterization procedure to create the bitmapped image (now halftoned) that will be passed to the queue manager 234 to ultimately be printed by print engine 236 as printed output, at index numeral 240. It will be understood that the dither array residing within laser printer 200 has already been created, and exists within the ROM 216 or font pool 232. It typically would not be efficient for the laser printer itself to create the dither array.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. In a computer system having a processing circuit and a memory storage device, a method for creating a gray level dot profile with minimum density variance useful for halftoning digital images, comprising the steps of:

(a) creating a delta density sum array and creating a dot profile array for one pre-determined gray level;

(b) shifting said delta density sum array to be centered at each location where the dot profile is equal to 1;

(c) creating an initially cleared cumulative density sum array and adding said delta density sum array to the cumulative density sum array for each location where the dot profile is equal to 1;

(d) determining an available set of dot locations and randomly selecting a pre-determined number of said available dot locations needed to create the next gray level;

(e) performing one of an addition and a subtraction to said dot profile array at said randomly selected dot locations, then at each said randomly selected dot location where the dot profile is equal to one of 1 and 0, respectively, shifting said delta density sum array to be centered at that location, and adding said delta density sum array to said cumulative density sum array; and (f) minimizing the variance of the density of said dot profile.

2. The method as recited in claim 1, wherein the step of creating a dot profile array and a delta density sum array is for a mid-gray level, and the step of determining an available set of dot locations and randomly selecting a pre-determined number of said available dot locations is repeated to create a succession of higher gray levels until the dot profile is completely filled with 1's, then the step of determining an available set of dot locations and randomly selecting a pre-determined number of said available dot locations is repeated, from the mid-gray level, to create a succession of lower gray levels until the dot profile is completely filled with 0's.

3. The method as recited in claim 1, wherein said delta density array uses a function of regions of various sizes.

4. The method as recited in claim 1, wherein said delta density array uses regions having a square shape.

5. The method as recited in claim 1, wherein said delta density array uses regions having a shape other than a square.

6. The method as recited in claim 5, wherein the shape of said regions is substantially circular.

7. The method as recited in claim 5, wherein the shape of said regions is substantially diamond-shaped.

8. The method as recited in claim 1, wherein the step of performing one of an addition and a subtraction to said dot profile array at said randomly selected dot locations includes, to create the next higher gray level, the addition of said randomly selected dots at dot locations where the dot profile is equal to 0.

9. The method as recited in claim 1, wherein the step of performing one of an addition and a subtraction to said dot profile array at said randomly selected dot locations includes, to create the next lower gray level, the subtraction of said randomly selected dots at dot locations where the dot profile is equal to 1.

10. The method as recited in claim 1, wherein the step of minimizing the variance of the density of said dot profile comprises an iterative process equivalent to simulated annealing.

11. The method as recited in claim 1, further comprising the steps of assigning a threshold value to locations in a threshold array that correspond to said selected dot locations; and repeatedly, for adjacent gray levels until all gray levels have been completed: determining an available set of dot locations and randomly selecting a predetermined number of said available dot locations needed to create the next gray level; performing one of an addition and a subtraction to said dot profile array at said randomly selected dot locations, then at each said randomly selected dot location where the dot profile is equal to one of 1 and 0, respectively, shifting said delta density sum array to be centered at that location, and adding said delta density sum array to said cumulative density sum array for each gray level; minimizing the variance of the density of said dot profile for each gray level; and assigning a threshold value to locations in the threshold array that correspond to said selected dot locations for each gray level; thereby creating said threshold array.

12. The method as recited in claim 1, wherein the step of determining an available set of dot locations and randomly selecting a pre-determined number of said available dot locations needed to create the next gray level is constrained by a target dot profile.

13. A method for halftoning digital images, comprising:
   (a) creating, as a pre-processing step, a threshold array with minimum density variance, by
      (i) creating a delta density sum array and creating a dot profile array for one pre-determined gray level;
      (ii) shifting said delta density sum array to be centered at each location where the dot profile is equal to 1;
      (iii) creating an initially cleared cumulative density sum array and adding said delta density sum array to the cumulative density sum array for each location where the dot profile is equal to 1;
      (iv) determining an available set of dot locations and randomly selecting a pre-determined number of said available dot locations needed to create the next gray level;
      (v) performing one of an addition and a subtraction to said dot profile array at said randomly selected dot locations, then at each said randomly selected dot location where the dot profile is equal to one of 1 and 0, respectively, shifting said delta density sum array to be centered at that location, and adding said delta density sum array to said cumulative density sum array;
      (vi) minimizing the variance of the density of said dot profile;
      (vii) assigning a threshold value to locations in the threshold array that correspond to said selected dot locations;
      (viii) repeatedly, until all gray levels have been completed: determining an available set of dot locations and randomly selecting a pre-determined number of said available dot locations needed to create the next gray level; performing one of an addition and a subtraction to said dot profile array at said randomly selected dot locations, then at each said randomly selected dot location where the dot profile is equal to one of 1 and 0, respectively, shifting said delta density sum array to be centered at that location, and adding said delta density sum array to said cumulative density sum array for each gray level; minimizing the variance of the density of said dot profile for each gray level; and assigning a threshold value to locations in the threshold array that correspond to said selected dot locations for each gray level;
   (b) providing a processing circuit and an incoming data signal containing digital image information; and
   (c) comparing, using said processing circuit, said threshold array to said incoming data signal, thereby creating a halftoned output data signal.

14. The method as recited in claim 13, wherein said incoming data signal contains black and white gray scale digital image information.

15. The method as recited in claim 13, wherein said incoming data signal contains color digital image information.

16. The method as recited in claim 13, further comprising the step of providing a print engine and printing a hard-copy halftoned image based upon said halftoned output data signal.

17. The method as recited in claim 1, wherein said delta density sum array comprises the matrix sum of a plurality of density sum arrays, each said density sum array representing a different region size.

18. The method as recited in claim 17, wherein each said density sum array has an associated weighting factor.

19. The method as recited in claim 13, wherein said delta density sum array comprises the matrix sum of a plurality of density sum arrays, each said density sum array representing a different region size.

20. The method as recited in claim 19, wherein each said density sum array has an associated weighting factor.

* * * * *